United States Patent
Maeda

(10) Patent No.: US 9,574,967 B2
(45) Date of Patent: Feb. 21, 2017

(54) WAVEFRONT MEASUREMENT METHOD, SHAPE MEASUREMENT METHOD, OPTICAL ELEMENT MANUFACTURING METHOD, OPTICAL APPARATUS MANUFACTURING METHOD, PROGRAM, AND WAVEFRONT MEASUREMENT APPARATUS

(71) Applicant: CANON KABUSHIKI KAISHA, Tokyo (JP)

(72) Inventor: Atsushi Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 14/446,150

(22) Filed: Jul. 29, 2014

(65) Prior Publication Data

US 2015/0036148 A1    Feb. 5, 2015

(30) Foreign Application Priority Data

Jul. 31, 2013 (JP) ................. 2013-159174

(51) Int. Cl.
   *G01M 11/02* (2006.01)
   *G01J 9/00* (2006.01)

(52) U.S. Cl.
   CPC .......... *G01M 11/0207* (2013.01); *G01J 9/00* (2013.01); *G01M 11/025* (2013.01); *G01M 11/0257* (2013.01); *G01M 11/0271* (2013.01)

(58) Field of Classification Search
   CPC ............. G03F 7/706; G01M 11/0257; G01M 11/0271; G01M 11/02; G01M 11/0207; G01M 11/025; G01M 11/0242; G01J 9/00; G01J 9/02; G01J 2009/002; A61B 3/1015; G02B 27/0025; G01B 11/2441; G01B 9/02039; G01B 9/02308; G03B 27/68

See application file for complete search history.

(56) References Cited

U.S. PATENT DOCUMENTS

| | | | | |
|---|---|---|---|---|
| 6,570,143 B1 * | 5/2003 | Neil | .......... | G01J 9/00 250/201.9 |
| 6,656,373 B1 * | 12/2003 | Neal | .......... | G01J 9/00 216/12 |
| 6,784,408 B1 * | 8/2004 | Cheung | .......... | G01J 9/00 250/201.9 |

(Continued)

FOREIGN PATENT DOCUMENTS

| JP | 2002-198279 A | 7/2002 |
|---|---|---|
| JP | 4212472 B2 | 1/2009 |

*Primary Examiner* — Gordon J Stock, Jr.
(74) *Attorney, Agent, or Firm* — Canon USA, Inc. IP Division

(57) ABSTRACT

A wavefront measurement method includes the steps of causing object light to be incident on a Shack-Hartmann sensor, capturing a first spot image under image pickup conditions, calculating data of first spot positions that correspond to the first spot image, calculating second spot positions by simulating a second spot image on the basis of the image pickup condition and information of a travelling direction of diffracted light generated when the object light passes through the microlenses, and reducing detection errors of the spot positions by correcting the data of the first spot positions on the basis of data of the second spot positions including data of a detection error due to the diffracted light.

29 Claims, 12 Drawing Sheets

(56) References Cited

U.S. PATENT DOCUMENTS

| | | | |
|---|---|---|---|
| 8,891,077 B2* | 11/2014 | Takaie | G01J 9/00 356/121 |
| 2002/0122163 A1 | 9/2002 | Inoue | |
| 2003/0086063 A1* | 5/2003 | Williams | A61B 3/1015 351/221 |
| 2004/0130705 A1* | 7/2004 | Topa | G01J 9/00 356/121 |
| 2005/0006559 A1* | 1/2005 | Smith | G01J 1/4257 250/201.9 |
| 2005/0196166 A1* | 9/2005 | Wirth | G02B 26/06 398/33 |
| 2005/0275946 A1* | 12/2005 | Choo | B29D 11/00365 359/619 |
| 2012/0314187 A1* | 12/2012 | Farrer | A61B 3/1015 351/221 |
| 2013/0202215 A1* | 8/2013 | Yonetani | G01B 11/255 382/203 |

* cited by examiner

WAVEFRONT MEASUREMENT METHOD, SHAPE MEASUREMENT METHOD, OPTICAL ELEMENT MANUFACTURING METHOD, OPTICAL APPARATUS MANUFACTURING METHOD, PROGRAM, AND WAVEFRONT MEASUREMENT APPARATUS

BACKGROUND OF THE INVENTION

Field of the Invention

The present invention relates to a wavefront measurement method which can be used to evaluate an optical element. The present invention also relates to a shape measurement method, an optical element manufacturing method, an optical apparatus manufacturing method, a program, and a wavefront measurement apparatus.

Description of the Related Art

In recent years, optical apparatuses, such as cameras, optical drives, and exposure apparatuses, including aspherical optical elements (mirrors, lenses, etc.) to reduce the size of optical systems installed therein have come into widespread use. To achieve efficient production of high-quality aspherical optical elements, a measurement technology for readily evaluating the shapes of the aspherical optical elements is required.

One well-known example of such a measurement technology is a measurement method using a Shack-Hartmann sensor including a microlens array and an image pickup element. When light is incident on an object, such as an aspherical optical element, and is reflected by the object, the reflected light travels as light (object light) having a wavefront that matches the shape of the object. The wavefront can be readily measured by detecting the object light with a Shack-Hartmann sensor, and the shape of the object can be determined from the measurement data of the wavefront.

When the object light is incident on the microlens array of the Shack-Hartmann sensor, a spot image including a plurality of spots are formed on the image pickup element. The spot image is captured, and the positions of the spots are detected. Incident angles of light rays incident on respective microlenses are calculated from the detected spot positions, and data of the wavefront of the object light can be readily calculated from the incident angle distribution of the light rays.

To increase the measurement resolution of the Shack-Hartmann sensor, it is necessary to reduce the pitch of the microlens array. However, when light is incident on each of the microlenses included in the microlens array, diffracted light is generated at the edges of the microlenses. Therefore, when the pitch is reduced, the diffracted light generated by the adjacent microlenses interferes with the spots, and the spot image will be distorted. Consequently, the wavefront measurement accuracy will be reduced. Therefore, to increase both the resolution and accuracy of the Shack-Hartmann sensor, it is necessary to reduce the error caused by the diffracted light generated by the adjacent microlenses.

Japanese Patent Laid-Open No. 2002-198279 describes a technology for reducing the influence (crosstalk) between the adjacent spots. According to Japanese Patent Laid-Open No. 2002-198279, first, an image of light incident on an object is captured by a wavefront aberration measurement apparatus, which includes a microlens array and an image pickup element. Thus, a light intensity distribution $J_0$ of each spot image is obtained. The position $P_0$ of each of the plurality of spots is calculated so that it can be expressed by a general formula $P_0=G(J_0)$ by using a known measurement method G, such as a centroid method. Also, image data $J_1$ based on the light intensity distribution expected to be obtained when it is assumed that the correct spot image is formed at the calculated positions $P_0$ are obtained. More specifically, on the basis of an algorithm F based on a predetermined optical model, such as the microlens array, $J_1=F(P_0)$ is approximated to a SINC function $(=(\text{Sin } x)/x)$. Then, comparative spot image positions CP are calculated as $CP=G(J_1)$ on the basis of the determined spot image $J_1$ by using the above-described calculation method G again. After that, the spot positions $P_0$ are corrected in accordance with the differences between the acquired positions $P_0$ and the calculated positions CP. As a result, the influence (crosstalk) between the adjacent spots can be reduced.

However, with the technology described in Japanese Patent Laid-Open No. 2002-198279, the image data $J_1$ is expressed by using a SINC function, with which the travelling direction of the diffracted light generated when the light passes through the microlenses cannot be accurately expressed. Therefore, the diffracted light that travels in a direction different from the direction of the above-described light rays is not appropriately expressed. As a result, the detection error due to the diffracted light generated by the adjacent microlenses cannot be sufficiently reduced.

Japanese Patent No. 4212472 proposes a configuration in which rectangular masks are evenly arranged along a microlens array such that axes thereof are rotated by 25° with respect to the direction of the adjacent spots. In this case, priority axes (X1, Y1, X2, and Y2) of the diffracted light extend in directions different from the directions of the adjacent spots and the next spots, so that the diffracted light does not overlap these spots.

However, when a wavefront with a large degree of asphericity is incident on the Shack-Hartmann sensor, the spots are displaced by large amounts and move to positions close to the adjacent spots. Therefore, there is a risk that the detection error cannot be sufficiently reduced. Thus, with the technology described in Japanese Patent No. 4212472, a wavefront with a large degree of asphericity cannot always be accurately measured.

The present invention provides a wavefront measurement method using a high-resolution, high-accuracy Shack-Hartmann sensor with which spot detection error due to diffracted light generated by adjacent microlenses is suppressed. The present invention also provides a shape measurement method, an optical element manufacturing method, an optical apparatus manufacturing method, a program, and a wavefront measurement apparatus.

SUMMARY OF THE INVENTION

A wavefront measurement method includes the steps of causing object light to be incident on a Shack-Hartmann sensor, which includes an image pickup element and a microlens array including a plurality of microlenses, and capturing a first spot image under image pickup conditions; calculating, on the basis of the first spot image, data of first spot positions that correspond to the first spot image; simulating a second spot image on the basis of the image pickup conditions and information of a travelling direction of diffracted light generated when the object light passes through the microlenses; calculating second spot positions that correspond to the second spot image; and correcting the data of the first spot positions on the basis of data of the second spot positions including data of a detection error due to the diffracted light, and calculating data of a wavefront of the object light.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Embodiments of the present invention will now be described with reference to the drawings.

Figure 1A:
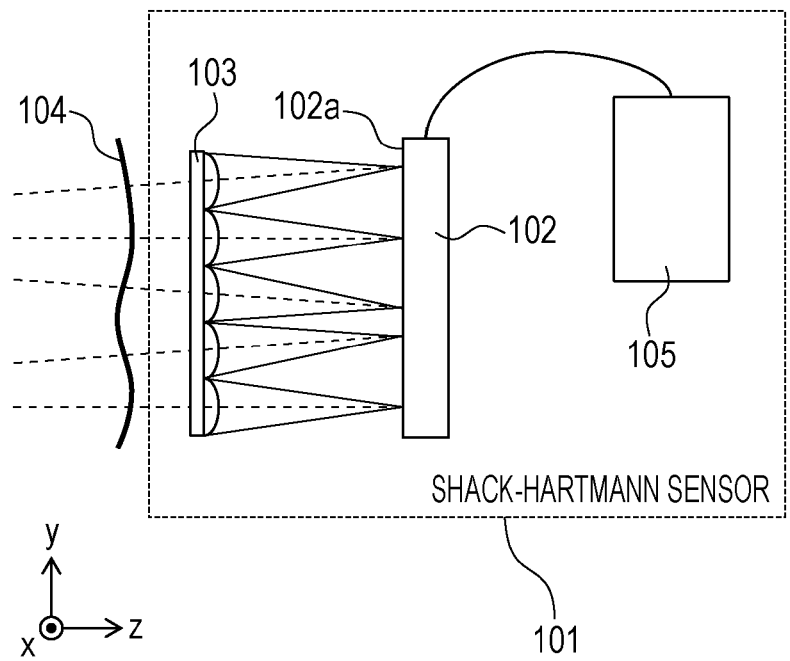
FIG. 1A is a schematic diagram illustrating a Shack-Hartmann sensor.

FIG. 1A is a schematic diagram illustrating a Shack-Hartmann sensor 101, which is a wavefront measurement apparatus used in the present embodiment. The Shack-Hartmann sensor 101 includes a microlens array 103 for dividing a wavefront 104 (object light) to produce a plurality of spots, and a CCD camera 102, which is an image pickup element for capturing a spot image of the generated spots. The Shack-Hartmann sensor 101 also includes a calculation unit 105 for calculating the wavefront 104 of the object light on the basis of the spot image received from the CCD camera 102. The image pickup element is not limited to a CCD camera, and may instead be, for example, a CMOS camera. Also, it is not necessary that the calculation unit 105 be a portion of the Shack-Hartmann sensor 101, and a computer that receives an output from the Shack-Hartmann sensor 101 and executes the calculation may be connected to the Shack-Hartmann sensor 101.

Figure 1B:
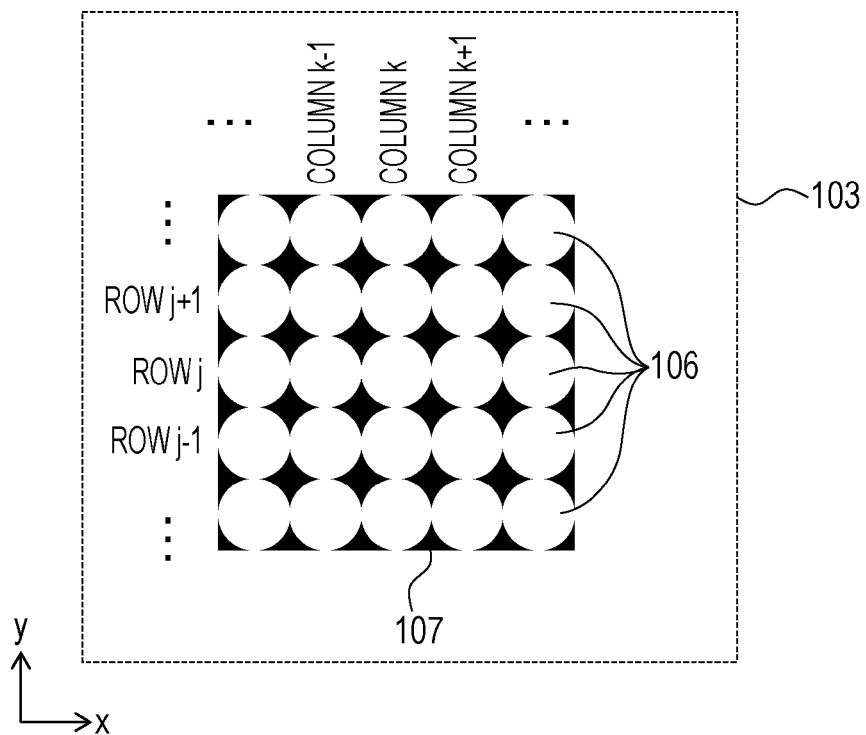
FIG. 1B is a schematic diagram illustrating a microlens array included in the Shack-Hartmann sensor.

FIG. 1B is a schematic diagram illustrating the microlens array 103. The microlens array 103 includes a plurality of microlenses 106 that are arranged along the same plane and that have substantially the same focal length f, and a light shielding mask 107 for blocking the wavefront 104 of the object light incident on the microlens array 103 in regions outside the microlenses 106. The regions of the light shielding mask 107 in which light is not blocked have a circular shape whose diameter is r, and the centers of these regions substantially coincide with the optical axes of the microlenses 106. The shapes of the microlenses 106 and the above-described regions of the light shielding mask 107 are not limited to a circular shape and may instead be a rectangular shape, and are not necessarily arranged in a square matrix pattern as long as they are arranged in a known pattern. The distance between the microlens array 103 and a light receiving surface 102a of the CCD camera 102 is substantially equal to the focal length f of the microlenses 106.

Figure 2:
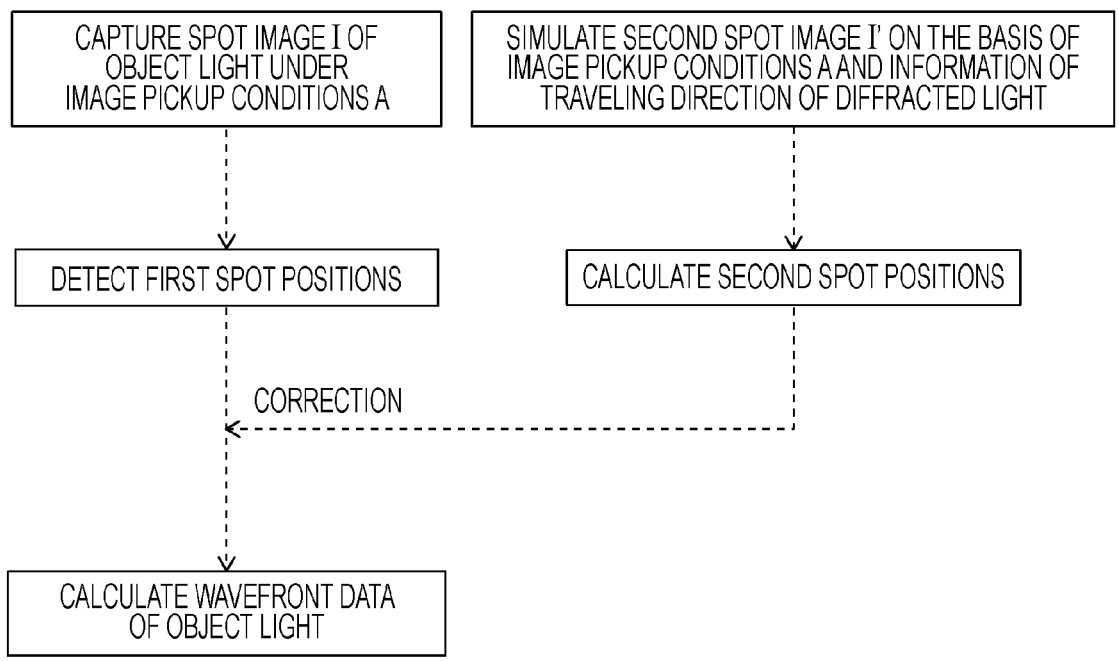
FIG. 2 illustrates the main part of the procedure of a wavefront measurement method according to an embodiment of the present invention.

FIG. 2 is a diagram illustrating the main part of the procedure of a wavefront measurement method according to an embodiment of the present invention.

First, a first spot image I of certain object light is captured with the Shack-Hartmann sensor under certain image pickup conditions A. The object light may be reflected light generated when an object is irradiated with light, or light emitted from an optical apparatus including a light source and an optical element. A first spot position is determined from the captured first spot image I by using a calculation method such as a centroid method.

The image pickup conditions A include, for example, the wavelength $\lambda$ of the object light, the shape of the microlenses included in the Shack-Hartmann sensor, the pitch of the microlens array, and the distance between the microlens array and the CCD camera. The above-described image pickup conditions A and information of the travelling direction of diffracted light generated by the object light incident on the microlenses are obtained in advance. Among the image pickup conditions A, optical axis positions $(x_{0,j,k}, y_{0,j,k})$ of the microlenses can be corrected by, for example, a method described in Applied Optics Vol. 44, No. 30, p 6419. The length $l_{j,k}$ can be corrected by a method described in Japanese Patent No. 3414368. Here, the optical axis position of the microlens 106 at the $j^{th}$ row and $k^{th}$ column in a coordinate system whose origin is at the center of a certain CCD pixel is defined as $(x_{0,j,k}, y_{0,j,k})$, and the distance to the light receiving surface 102a of the CCD camera 102 is defined as $l_{j,k}$. The information of the travelling direction of the diffracted light may be calculated from the design value of the object, data of the first spot position, or the image pickup conditions A.

The information of the travelling direction of the diffracted light includes data and a function reflecting the direction in which the diffracted light generated by the microlenses travel with respect to the travelling direction of the object light incident on the microlenses. This may be the distribution of complex amplitude of an electric field expressing the travelling direction of the diffracted light.

Then, a second spot image I' is simulated on the basis of the image pickup conditions A and the information of the travelling direction of the diffracted light. Data of a second spot position, which is the position of each spot of the second spot image I', includes data of a detection error expected to be generated by the diffracted light generated by the microlenses adjacent to the corresponding microlens.

Data of the wavefront of the object light is calculated by correcting the data of the detected first spot position on the basis of the data of the detection error included in the second spot position.

This is the main part of the procedure of the wavefront measurement method according to an embodiment the present invention.

The procedure may be applied to a method for measuring the shape of an object, by calculating the shape of the object on the basis of the data of the calculated wavefront of the object light.

Also, a program for causing a computer to execute the above-described steps in accordance with the output of the Shack-Hartmann sensor may be provided.

First Embodiment

Figure 3:
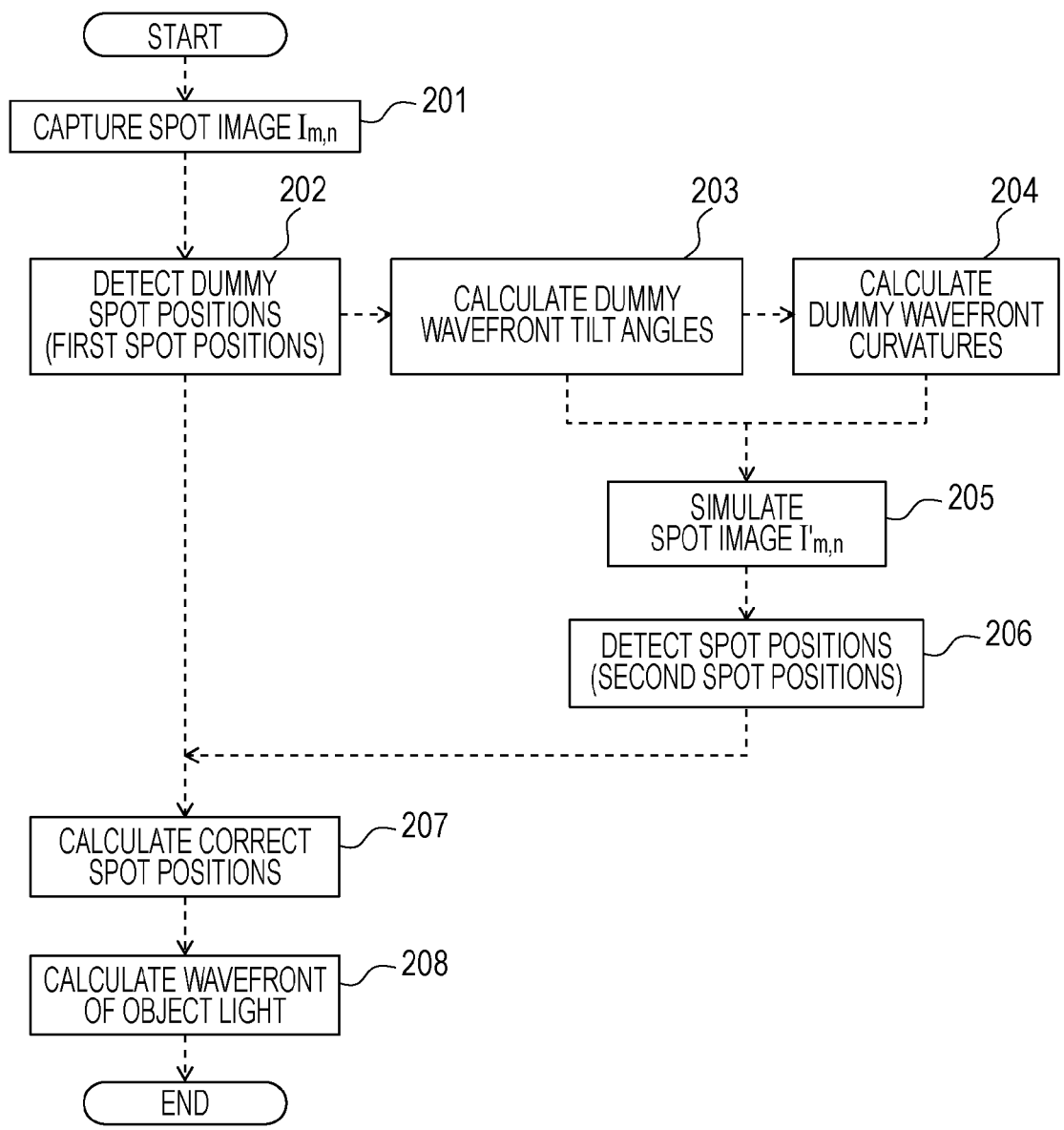
FIG. 3 is a flowchart of the procedure of a wavefront measurement method according to a first embodiment.

FIG. 3 illustrates the procedure of the wavefront measurement method according to a first embodiment. The procedure will be described with reference to other figures as appropriate. First, the object light is caused to be incident on the microlens array 103, so that a plurality of spots are formed on the CCD camera 102, and the first spot image I is captured (Step 201). After that, spot positions ($X_{j,k}$, $y_{j,k}$) which are the first spot positions, are determined from the output signals $I_{m,n}$ of the CCD camera 102 (spot image corresponding to outputs from pixels of m rows and n columns) (Step 202). Hereinafter, the spot positions ($x_{j,k}$, $y_{j,k}$) will sometimes be referred to as "dummy spot positions". In an example of a method for determining the spot positions, images of regions around points at which the spot image has peaks are extracted, and the centroids of the images are determined from Expressions (1) and (2).

$$x_{j,k} = \frac{\sum_m \sum_n I^s_{m,n} np}{\sum_m \sum_n I^s_{m,n}} \quad (1)$$

$$y_{j,k} = \frac{\sum_m \sum_n I^s_{m,n} mp}{\sum_m \sum_n I^s_{m,n}} \quad (2)$$

Here, p represents the pitch of the CCD pixels. The value of s is around 1 to 3, and may be adjusted as appropriate in accordance with the relationship between the spot size and the pitch p of the CCD pixels. Although Expressions (1) and (2) are used in the present embodiment, another method may instead be used. For example, the image of each spot may be fitted to an expression, such as Gaussian function, which appropriately expresses an image of a spot, and the center of the image may be determined as the spot position ($x_{j,k}$, $y_{j,k}$) of the spot.

Figure 4:
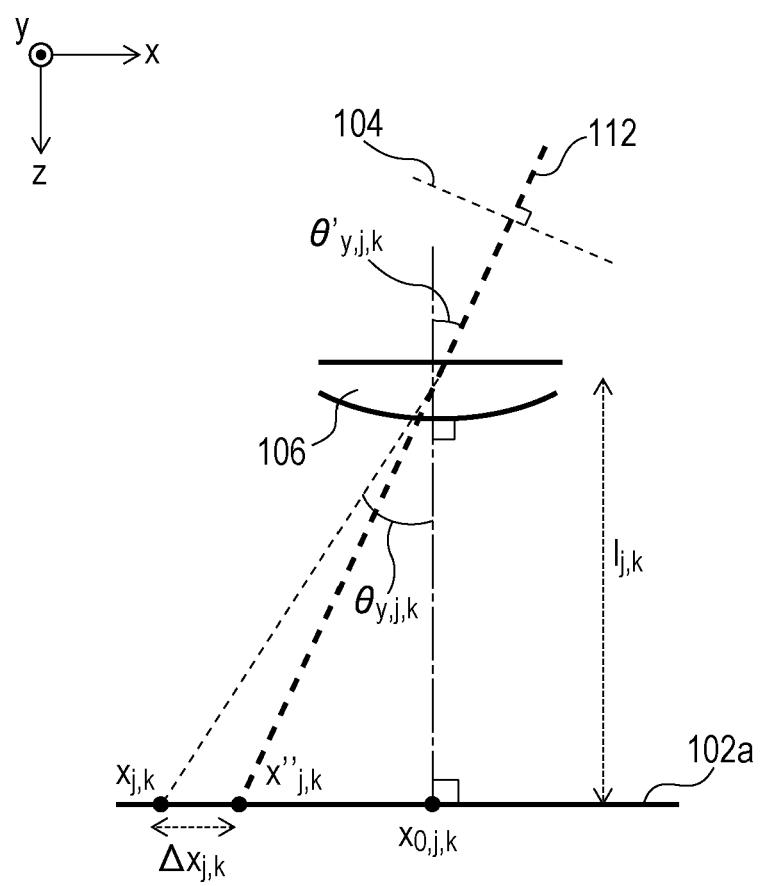
FIG. 4 is a diagram illustrating the relationship between a wavefront, a light ray, a microlens, a CCD receiving surface, and a detected spot position in the first embodiment.

FIG. 4 illustrates the relationship between the wavefront 104 of the object light, a light ray 112 indicating the travelling direction of the object light, a microlens 106, the CCD light receiving surface 102a, and one of the determined spot positions $x_{j,k}$.

As described above, each dummy spot position ($x_{j,k}$, $y_{j,k}$) is influenced by the diffracted light generated at the boundaries between the adjacent microlenses (not shown) and the light shielding mask, and is therefore not the same as the accurate spot position. As an example, a case will be considered where the image pickup conditions are such that a plane wave having a wavelength of 638 nm is incident on a Shack-Hartmann sensor having a focal length f of 5 mm and a lens pitch of 0.15 mm. In this case, spots having a size of about 40 μm are generated. Diffracted light from the adjacent microlenses is incident at an angle of about 2°, and interference fringes with a pitch of about 20 μm are formed in the spot. Since the pitch of the interference fringes is smaller than the spot size, the interference fringes cause a distortion of the spot. As a result, a spot detection error ($\Delta x_{j,k}$, $\Delta y_{j,k}$), which is a difference between the dummy spot position ($x_{i,j}$, $y_{i,j}$) and a correct spot position ($x''_{j,k}$, $y''_{j,k}$), of about 1/100 pix (100 nm) is generated. When $l_{j,k}=f=5$ mm, the spot detection error causes an error in wavefront tilt angle that is as large as 20 μrad, which is not negligibly small. Therefore, it is necessary to reduce the detection error ($\Delta x_{j,k}$) due to the diffracted light by, for example, the method described below.

Simulation of Spot Image

A correction based on simulation is performed to reduce the above-described error. The simulation requires an input of an tilt angle of the wavefront incident on each microlens. Therefore, first, the approximate tilt angle ($\theta_{x,j,k}$, $\theta_{y,j,k}$) of the wavefront 104 (dummy tilt angle of wavefront) is determined for each spot (Step 203). Here, $\theta_{x,j,k}$ and $\theta_{y,j,k}$ are defined as angles of tilt of the wavefront from the optical axis of the microlens with respect to the x axis and the y axis, respectively. The light ray 112 extends in a direction orthogonal to the wavefront 104, and the tilt angle of the wavefront 104 of the object light incident on the microlens 106 is the same as the incident angle of the light ray 112 that passes through the center of the microlens. Therefore, a correct tilt angle ($\theta'_{x,j,k}$, $\theta'_{y,j,k}$) of the wavefront without an error, and the correct spot position ($x''_{j,k}$, $y''_{j,k}$), which is the intersection of the light ray 112 and the CCD light receiving surface 102a, satisfy Expressions (3) and (4).

$$\theta'_{x,j,k} = \operatorname{Tan}^{-1}\left(\frac{y''_{j,k} - y_{0,j,k}}{l_{j,k}}\right) \quad (3)$$

$$\theta'_{y,j,k} = \operatorname{Tan}^{-1}\left(\frac{x''_{j,k} - x_{0,j,k}}{l_{j,k}}\right) \quad (4)$$

When it is assumed that the dummy spot position ($x_{j,k}$, $y_{j,k}$) is close to the correct spot position ($x''_{j,k}$, $y''_{j,k}$), the correct tilt angle ($\theta'_{x,j,k}$, $\theta'_{y,j,k}$) of the wavefront can be approximated as in Expressions (5) and (6). In FIG. 4, $x_{j,k}$ and $x''_{j,k}$ are drawn at positions more distant from each other than the actual positions.

$$\theta'_{x,j,k} = \operatorname{Tan}^{-1}\left(\frac{y''_{j,k} - y_{0,j,k}}{l_{j,k}}\right) \approx \operatorname{Tan}^{-1}\left(\frac{y_{j,k} - y_{0,j,k}}{l_{j,k}}\right) = \theta_{x,j,k} \quad (5)$$

$$\theta'_{y,j,k} = \operatorname{Tan}^{-1}\left(\frac{x''_{j,k} - x_{0,j,k}}{l_{j,k}}\right) \approx \operatorname{Tan}^{-1}\left(\frac{x_{j,k} - x_{0,j,k}}{l_{j,k}}\right) = \theta_{y,j,k} \quad (6)$$

The angle ($\theta_{j,k}$, $\theta_{y,j,k}$) is calculated as the dummy tilt angle. The values of $l_{j,k}$, $x_{0,j,k}$, and $y_{0,j,k}$ required for the calculation are corrected as described above, and are known.

Figure 5:
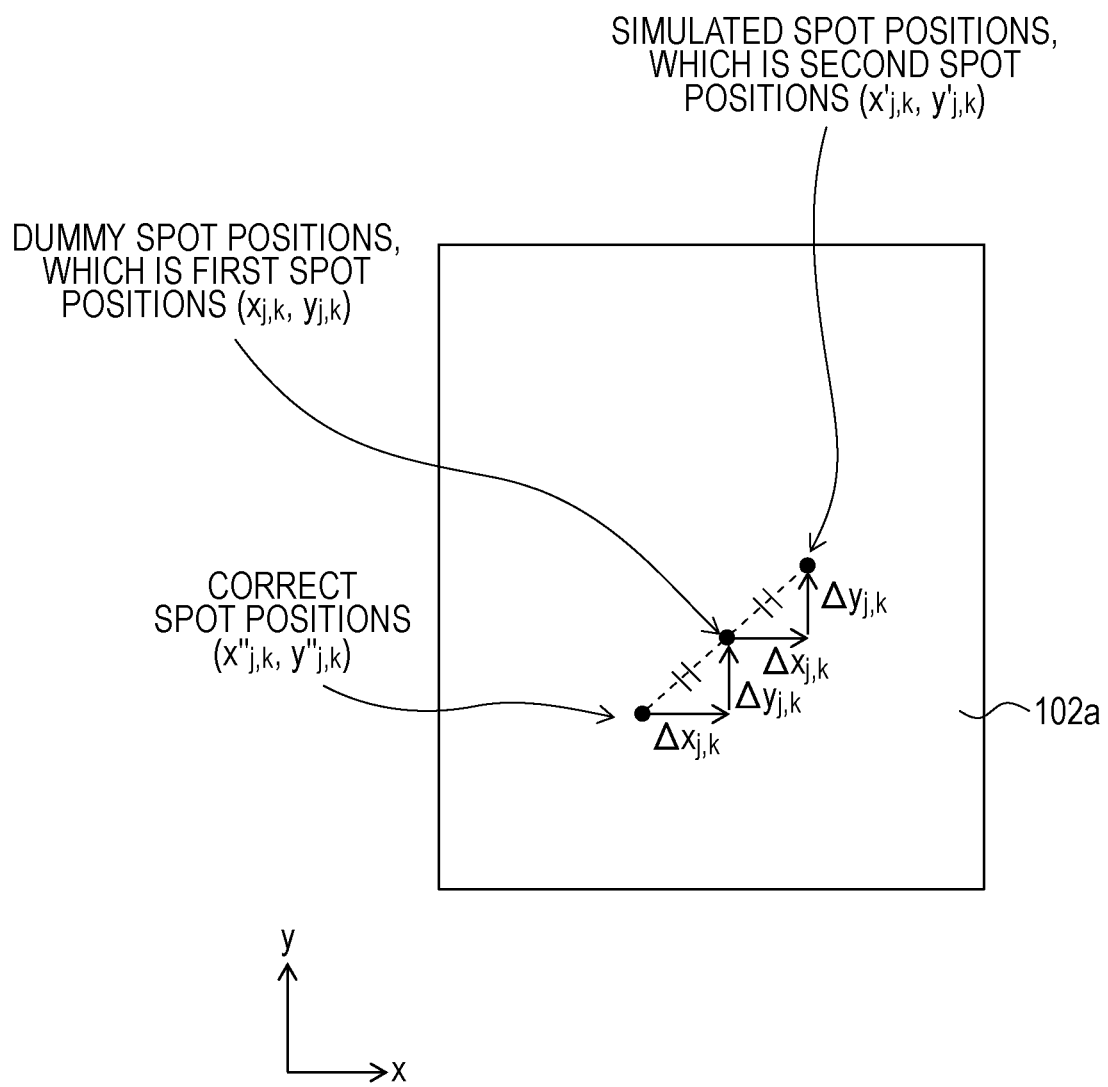
FIG. 5 is a diagram illustrating the relationship between a spot position determined from an actually obtained spot image and a spot position determined from a spot image obtained by simulation according to the first embodiment.

FIG. 5 illustrates the relationship between a spot position determined from an actually obtained spot image, and a spot position determined from a spot image obtained by simulation as described below according of the first embodiment.

As described above, in the approximation of Expressions (5) and (6), it is assumed that the intersection of the light ray that passes through the center of the microlens 106 at the $j^{th}$ row and $k^{th}$ column and the CCD light receiving surface 102a is the same as the dummy spot position ($x_{i,j}$, $y_{i,j}$). Also, it is assumed that the amount of shift of the spot image from the correct spot position to the dummy spot position due to the influence of the diffracted light, and the amount of shift of the spot image due to the diffracted light generated when the correct spot position is at the dummy spot position are both ($\Delta x_{j,k}$, $\Delta y_{j,k}$). It is assumed that the difference between the first spot position and the correct spot position is equal to the difference between the second spot position and the first spot position.

On the above-described assumptions, an approximate curvature ($\rho_{x,j,k}$, $\rho_{y,j,k}$) of the wavefront incident on each microlens 106 (dummy curvature of wavefront) is determined from the calculated dummy tilt angle ($\theta_{x,j,k}$, $\theta_{y,j,k}$) by using, for example, Expressions (7) and (8) (Step 204).

$$\rho_{x,j,k} = \frac{\theta_{x,j+1,k} - \theta_{x,j-1,k}}{y_{j+1,k} - y_{j-1,k}} \quad (7)$$

$$\rho_{y,j,k} = \frac{\theta_{y,j,k+1} - \theta_{y,j,k-1}}{x_{j,k+1} - x_{j,k-1}} \quad (8)$$

After the dummy curvature of the wavefront is determined, the complex amplitude w of the electric field of the light that has passed through each microlens 106 is determined. When, for example, the microlens 106 is approximated as a stigmatic lens, and when it is assumed that the wavefront 104 of the object light incident on a single microlens 106 can be locally approximated as a spherical wave, the complex amplitude of the electric field (hereinafter an "electric field") immediately after passing through the microlens can be determined as follows.

$$w_{0,j,k}(x,y) = \begin{cases} \exp\left\{-\frac{i\pi}{\lambda}\left[(x-x_{0,j,k})^2\left(\frac{1}{f} - \rho_{y,j,k}\right) + \right.\right. \\ \left.\left. (y-y_{0,j,k})^2\left(\frac{1}{f} - \rho_{x,j,k}\right) + 2(x-x_{0,j,k})\sin\theta_{y,j,k} + \right.\right. \\ \left.\left. 2(y-y_{0,j,k})\sin\theta_{x,j,k}\right]\right\} ((x-x_{0,j,k})^2 + (y-y_{0,j,k})^2 \leq r^2) \\ 0 \quad ((x-x_{0,j,k})^2 + (y-y_{0,j,k})^2 > r^2) \end{cases} \quad (9)$$

The parameters of this expression include the image pickup conditions (image pickup conditions A), such as the optical axis position ($x_{0,j,k}$, $y_{0,j,k}$) of each microlens 106 and the wavelength of the light to be measured, and information of the angle at which the object light is incident on the microlens 106, and $w_{0,j,k}$ is calculated on the basis of these parameters. The diffracted light is generated at the boundaries between the microlenses 106 and the light shielding mask 107, and three pieces of information, which are the shape of the light shielding mask, the electric field in the regions where light is not blocked, and the wavelength, are required to perform an accurate calculation by taking the travelling direction of the diffracted light into consideration. Here, $w_{0,j,k}(x, y)$ calculated from Expression (9) includes information of the shape of the light shielding mask and the electric field in the regions where light is not blocked. Therefore, data of the combination of $w_{0,j,k}(x, y)$ and the value of the wavelength corresponds to the information of the travelling direction of the diffracted light.

After the electric field $w_{0,j,k}(x, y)$ immediately after passing through each microlens (data of first electric field) is determined, the second spot image I' output by the CCD camera 102 is simulated (Step 205).

To determine the second spot image I' by simulation, first, an electric field $W_{j,k}(x, y, l_{j,k})$ after propagation from the electric field $w_{0,j,k}(x, y)$ to the CCD light receiving surface 102a by the distance $l_{j,k}$ is calculated. Then, the intensity I'$_{m,n}$ of light incident on each pixel of the CCD camera 102, that is, the output signal from each pixel, is calculated from Expression (10).

$$I'_{m,n} = \int_{p(m-1/2)}^{p(m+1/2)} \int_{p(n-1/2)}^{p(n+1/2)} \left| \sum_j \sum_k w_{j,k}(x, y, l_{j,k}) \right|^2 dx\,dy \quad (10)$$

Similar to the actual output signal $I_{m,n}$, the output signal I'$_{m,n}$ of the CCD camera simulated by Expression (10) also corresponds to a plurality of spots.

Here, the method for determining $W_{j,k}(x, y, l_{j,k})$ (data of second electric field) from $w_{0,j,k}(x, y)$ is important. As described above, the detection error due to the interference between the diffracted light from the adjacent lenses and each spot is expected to be reduced. To reduce the detection error, it is necessary to appropriately express the interference fringes generated by the diffracted light and the spot light. For this purpose, it is necessary to appropriately express the manner in which the diffracted light that has propagated travels in a direction different from the direction of the incident light ray, and a method that realizes this must be used to calculate the propagation of the electric field from the microlens to the CCD light receiving surface. Although the information of the travelling direction of the diffracted light is included in the data of the electric field $w_{0,j,k}(x, y)$ immediately after passing through the microlens and the wavelength data, this information will be lost after the propagation unless the propagation of the electric field is calculated by an appropriate method. An example of an optical propagation model for appropriately expressing the travelling direction of the diffracted light after the propagation is, for example, the angular spectrum method. With this method, the real-space distribution $w_{0,j,k}(x, y)$ of the electric field before the propagation is converted into the distribution in the frequency space ($v_x$, $v_y$) by Fourier transformation. Then, the electric field after the propagation by the distance $l_{j,k}$ is calculated, and is converted into the real space distribution $w_{j,k}(x, y, l_{j,k})$ again. More specifically, the propagation of the electric field is calculated by Expression (13) (refer to J. W. Goodman, "Introduction to Fourier optics 2nd edition", McGraw-Hill, p 55-(1996)).

$$w_{j,k}(x, y, l_{j,k}) = \int\int\left[\int\int w_{0,j,k}(\xi, \eta)e^{2\pi i(\xi v_x + \eta v_y)}d\xi d\eta\right] \quad (11)$$
$$e^{\frac{2\pi i l_{j,k}}{\lambda}\sqrt{1-\lambda^2(v_x^2+v_y^2)}} e^{2\pi i(xv_x+yv_y)}dv_x dv_y$$

When a tilted optical wavefront is incident on an xy plane, the complex amplitude of the electric field vibrates in the xy plane. When the tilt angle is ($\phi_x$, $\phi_y$), the spatial frequency ($v_x$, $v_y$) of the vibration and the tilt angle ($\phi_x$, $\phi_y$) satisfy Expressions (12) and (13).

$$v_x = \frac{\cos\left(\frac{\pi}{2} - \varphi_x\right)}{\lambda} \quad (12)$$

-continued $$v_y = \frac{\cos(\frac{\pi}{2} - \varphi_y)}{\lambda} \quad (13)$$

In other words, acquisition of the electric field distribution in the frequency space corresponds to acquisition of the electric field distribution with respect to the travelling direction ϕ. Therefore, with the angular spectrum method, the electric field in the ($\phi_x$, $\phi_y$) space is calculated, and the propagation thereof is also calculated in the ($\phi_x$, $\phi_y$) space. As a result, the calculated electric field distribution after the propagation includes the information of the travelling direction of light, and the electric field of the diffracted light that travels in a direction different from the direction of the incident light ray can also be accurately calculated. Based on the above-described characteristics of the angular spectrum method, when the electric field $w_{j,k}$(x, y, $l_{j,k}$) on the CCD light receiving surface is calculated in the present embodiment, $w_{0,j,k}$(x, y) calculated from Expression (9) is substituted into Expression (11). Accordingly, $w_{j,k}$ includes the information of the travelling direction of the diffracted light, and calculating the spot image I' by substituting $w_{j,k}$ into Expression (10) corresponds to simulating the spot image I' on the basis of the information of the travelling direction of the diffracted light. The spot image I' is calculated from Expression (10) on the basis of $w_{j,k}$, $w_{j,k}$ is calculated from Expression (11) on the basis of $w_{0,j,k}$, $l_{j,k}$, which is one of the image pickup conditions A, and λ, and $w_{0,j,k}$ is calculated from Expression (9) on the basis of the image pickup conditions A. Thus, the second spot image I' is calculated on the basis of the image pickup conditions A.

After the spot image $I'_{m,n}$ is determined by simulation, the spot position ($x'_{j,k}$, $y'_{j,k}$), which is the second spot position, is determined for each spot by Expressions (14) and (15) (Step 206).

$$x'_{j,k} = \frac{\sum_m \sum_n I'_{m,n}{}^s np}{\sum_m \sum_n I'_{m,n}{}^s} \quad (14)$$

$$y'_{j,k} = \frac{\sum_m \sum_n I'_{m,n}{}^s mp}{\sum_m \sum_n I'_{m,n}{}^s} \quad (15)$$

After the second spot position ($x'_{j,k}$, $y'_{j,k}$) is determined, the dummy spot position ($x_{i,j}$, $y_{i,j}$) is corrected for each spot by using this data to obtain the correct spot position ($x''_{j,k}$, $y''_{j,k}$) (Step 207).

Referring to FIG. 5, the correct spot position ($x''_{j,k}$, $y''_{j,k}$) is calculated for each spot by Expressions (16) and (17) (Step 207).

$$x''_{j,k} = 2x_{j,k} - x'_{j,k} \quad (16)$$

$$y''_{j,k} = 2y_{j,k} - y'_{j,k} \quad (17)$$

After the correct spot position ($x''_{j,k}$, $y''_{j,k}$) is determined, the correct tilt angle ($\theta'_{x,j,k}$, $\theta'_{y,j,k}$) of the wavefront incident on each microlens 106 is determined by Expressions (3) and (4). The data of the wavefront 104 is determined by two-dimensionally integrating the correct tilt angle ($\theta'_{x,j,k}$, $\theta'_{y,j,k}$) (Step 208).

The general meaning of Equations (16) and (17) will now be described. When the correct spot position to be determined is a so-called "true value" and the amount of shift of the spot image due to the diffracted light is a "detection error", the following equation is satisfied:

True Value=2×(True Value+Detection Error)−(True Value+2×(Detection Error))

This corresponds to multiplication of the data of dummy spot position ($x_{i,j}$, $y_{i,j}$) (=True Value+Detection Error) obtained by an image pickup process performed by the Shack-Hartmann sensor by 2.

The above equation also corresponds to "correction" of the measurement error due to the diffracted light by using the data of the spot position ($x'_{j,k}$, $y'_{j,k}$) simulated on the basis of the image pickup conditions and the information of the travelling direction of the diffracted light (=True Value+2× (Detection Error)).

As described above, in FIG. 5, it is assumed that the amount of shift of the spot image from the correct spot position to the dummy spot position due to the influence of the diffracted light, and the amount of shift of the spot image due to the diffracted light generated when the correct spot position is at the dummy spot position are the same. In other words, it is assumed that the difference between the first spot position and the correct spot position is equal to the difference between the second spot position and the first spot position. Since Expressions (16) and (17) are derived from this assumption in FIG. 5, the correction of the dummy spot position using Expressions (16) and (17) corresponds to the correction of the first spot position (=dummy spot position) based on the above-described assumption. As a result, the data of the wavefront 104 in which the detection error due to the diffracted light is reduced can be obtained by calculating the data of the correct spot position ($x''_{j,k}$, $y''_{j,k}$), which is the "true value" to be determined.

As is clear from the above, it is also an advantage of the present embodiment that the data of the first spot position can be corrected without directly calculating the "error".

According to the present embodiment, the wavefront data in which the error due to the diffracted light from the adjacent microlenses is reduced can be calculated. In the case where the reflected light generated when the object is irradiated with light is used as the object light, the wavefront data accurately reflects the shape of the object. Therefore, the present embodiment may be applied to an adjustment of an optical system or a measurement of the shape of an object.

The present embodiment may also be applied to manufacturing of an optical apparatus including a light source and an optical element. For example, light emitted from the optical apparatus may be measured in accordance with the present embodiment, and the optical element in the optical apparatus may be subjected to a position adjustment or processed so as to suppress the wavefront aberration.

Error Due to Low-Resolution of Pixels

Figure 6:
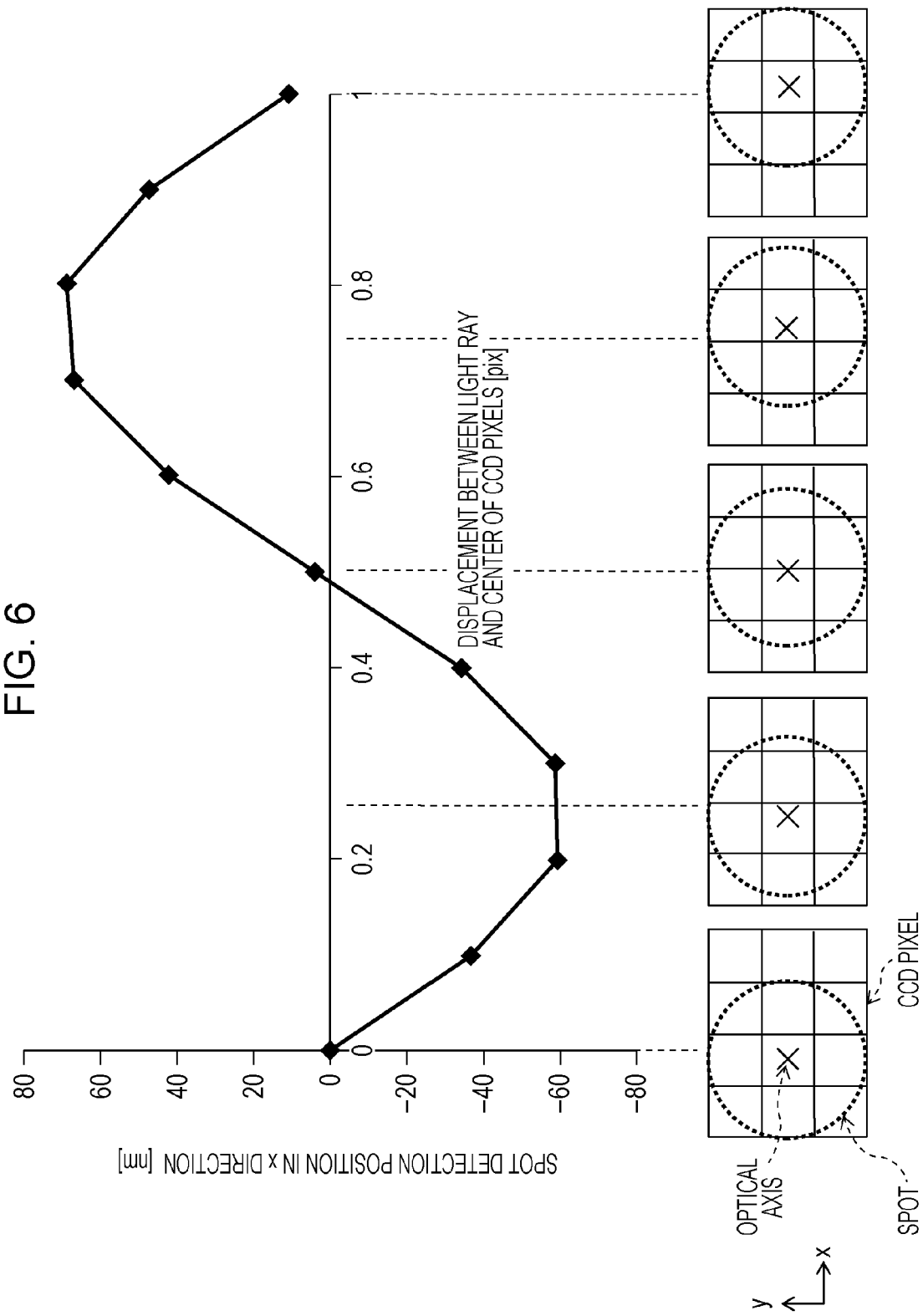
FIG. 6 is a diagram illustrating the result of simulation of the relationship between the relative position between a spot and CCD pixels and the detection result of the spot.

In the case where the resolution of the CCD pixels is low, the error in the detected spot position greatly depends on the relationship between the spot and the pixel arrangement of the CCD camera 102. FIG. 6 illustrates the result of simulation using Expression (9), which expresses the electric field $w_{0,j,k}$(x, y), of the error in the spot position detected by the Shack-Hartmann sensor. More specifically, first, the electric field immediately after passing through the microlens is calculated by Expression (9), and is substituted into Expression (11) to calculate the electric field on the CCD light receiving surface. Then, the calculation result is substituted into Expression (10) to obtain the second spot image I'. Then, the spot position is simulated by using the centroid method (Expressions (14) and (15)). The input parameters include the focal length f=5 mm, the lens pitch 0.15 mm, and p=9 μm. It is assumed that a plane wave having a wavelength of 638 nm is incident on the CCD light receiving surface in a direction perpendicular to the CCD light receiving surface, and it is assumed that $\theta_{x,j,k}=\theta_{y,j,k}=\rho_{x,j,k}=\sigma_{y,j,k}=0$. With regard to symbol E in Expression (10), the sum for j=−1, 0, 1 and k=−1, 0, 1 is calculated. In Expressions (14) and (15), the spot position generated by the microlens at j=k=0 is determined. The horizontal axis represents the displacement between the light ray that passes through the center of the microlens and the center of the CCD pixels, and the vertical axis represents the spot detection position in the case where the origin is at the position of the light ray.

When the position of the light ray coincides with the center of the CCD pixels, the spot shape and the arrangement of the CCD pixels have common axes of symmetry in both x and y directions. Therefore, the CCD output is also symmetric with respect to the axes of symmetry. As a result, the centroid position determined by substituting the CCD output into Expressions (1) and (2) is at the intersection of the axes of symmetry. Since the intersection coincides with the position of the light ray, the calculated centroid position also coincides with the position of the light ray. In other words, the spot detection error is 0. However, when there is a relative displacement between the position of the light ray and the center of the CCD pixels, the spot shape and the arrangement of the CCD pixels have not common axes of symmetry. As described above, owing to the diffracted light, the spot image has interference fringes with a pitch of about 20 μm. It is not possible to obtain sufficiently reliable shape information by capturing a spot image having such a fine shape with a low-resolution CCD camera with a pixel pitch of 9 μm. The spot position determined from such a CCD output is shifted from the center of the spot (optical axis position), and the amount of shift is 60 nm at a maximum. To achieve a high-accuracy correction, it is important to perform simulation by taking also the error due to the low-resolution pixels into account. Therefore, in Expression (10), the output signal of each pixel of the CCD is calculated as a spot image, so that the error due to the low-resolution pixels can be accurately simulated.

When CCD Camera with Microlenses for Increasing Amount of Light is Used

In some CCD cameras, charge transfer regions are provided between the light-receiving regions of the respective pixels, and microlenses (not shown) for increasing the amount of light incident on the light-receiving regions are provided directly above the CCD light receiving surface. In this case, electric field $w'_{j,k}(x, y, l_{j,k})$ of light that has passed through the microlenses may be calculated from the electric field calculated by Expression (11), and substituted into Expression (18) to simulate the spot image $I'_{m,n}$.

$$I'_{m,n} = \int\int_{S_{m,n}} \left| \sum_j \sum_k w'_{j,k}(x, y, l_{j,k}) \right|^2 dx\,dy \qquad (18)$$

Here, $S_{m,n}$ represents the image receiving region of the pixel at the $m^{th}$ row and $n^{th}$ column.

First Comparative Example

Although the angular spectrum method is used in the first embodiment, other methods may instead be used as long as the manner in which the diffracted light propagates in a direction different from the direction of the incident light ray can be appropriately expressed. For example, a finite difference time domain (FDTD) method may be used. When approximation conditions are satisfied, diffraction equation based on Fraunhofer approximation or Fresnel approximation may be used. However, it is not desirable to use an approximate expression that does not appropriately express the manner in which the electric field of the diffracted light propagates in a direction different from the direction of the incident light ray. For example, assume that, in a case where a plane wave is incident on a circular stigmatic microlens whose diameter is r, the complex amplitude of the electric field at the focal plane is calculated by using an approximate expression for Fresnel diffraction. In this case, when the phase term is omitted without appropriately applying the approximation expression, the complex amplitude of the electric field is calculated as in Expression (19).

$$w_{j,k}(x, y, f) = \int_0^r J0\left(\frac{2\pi}{\lambda} - \frac{\rho\sqrt{(x-x0, j, k)^2 + (y-y0, j, k)^2}}{f}\right)\rho d\rho \qquad (19)$$

In the above expression, $J_0(x)$ represents the 0th order Bessel function. In the case where a rectangular lens, each side of which has a length of r, is used, the complex amplitude of the electric field at the focal plane is calculated as in Expression (20).

$$w_{j,k}(x, y, f) = \mathrm{sinc}\left(\frac{\pi r(x - x_{0,j,k})}{\lambda\sqrt{f^2 + r^2}}\right)\mathrm{sinc}\left(\frac{\pi r(y - y_{0,j,k})}{\lambda\sqrt{f^2 + r^2}}\right) \qquad (20)$$

Here, sinc(x) is called a SINC function, and is expressed as follows:

$$\mathrm{sinc}(x) = \frac{\sin x}{x} \qquad (21)$$

Although $w_{i,j}(x, y, z)$ is calculated as the complex amplitude in Expressions (19) and (20), a real number is output for any real number (x, y). More specifically, the electric field at the focal plane calculated by these expressions forms an equiphase surface to infinity, and the travelling direction is parallel to the optical axis of the microlens. In other words, the information of the travelling direction of the diffracted light is not included. Therefore, the manner in which the diffracted light travels in a direction different from the directions of the incident light and the spot light cannot be expressed, and the interference fringes generated by the spot light and the diffracted light cannot be appropriately reproduced. Consequently, the above-described spot detection error ($\Delta x_{j,k}$, $\Delta y_{j,k}$) due to the diffracted light cannot be appropriately corrected by the simulation using Expressions (19) and (20).

Second Embodiment

In a second embodiment, similar to the first embodiment, the Shack-Hartmann sensor illustrated in FIG. 1 is used.

Figure 7:
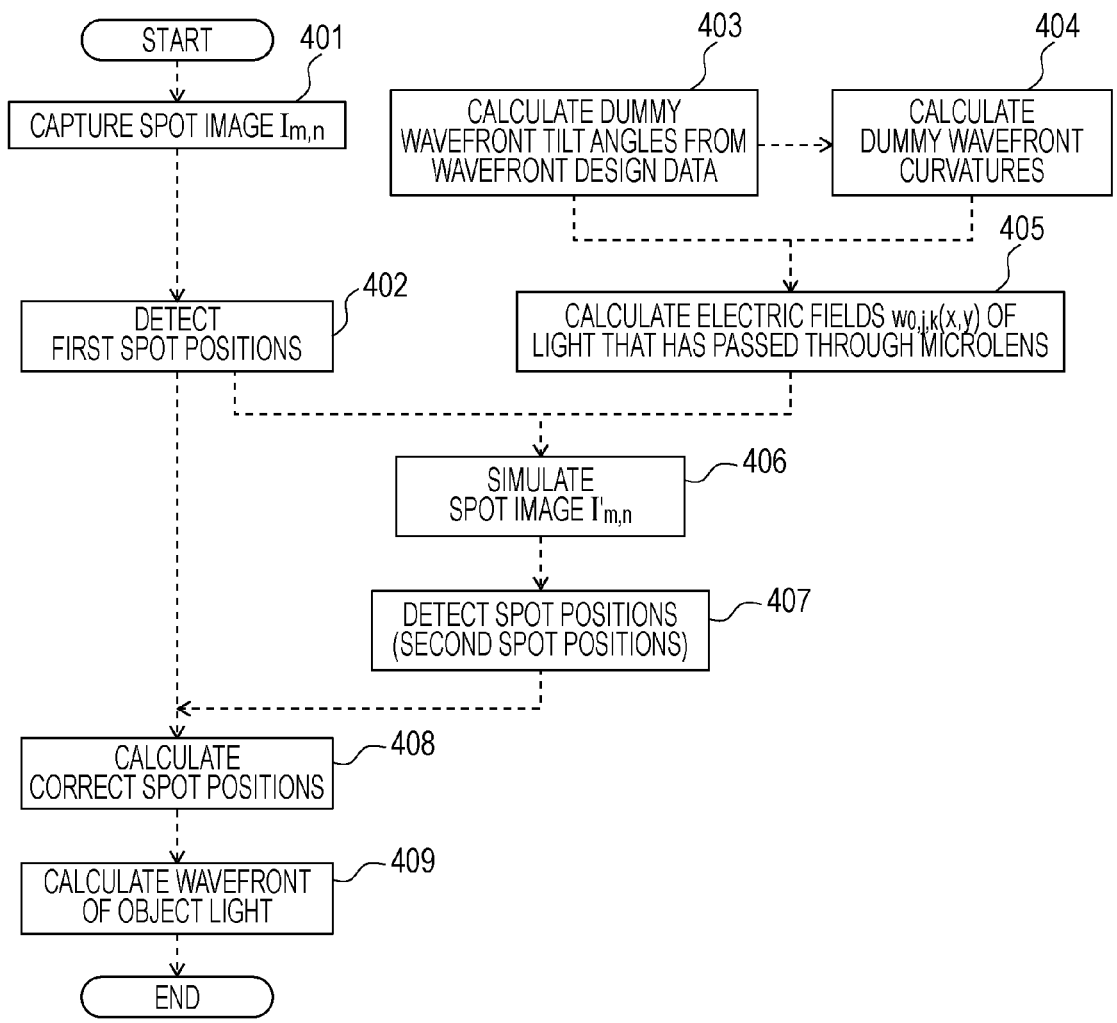
FIG. 7 is a flowchart of the procedure of a wavefront measurement method according to a second embodiment.

FIG. 7 illustrates the procedure of the wavefront measurement method according to the present embodiment. In the first embodiment, to simulate the spot image, the dummy tilt angle ($\theta_{x,j,k}$, $\theta_{y,j,k}$) and the dummy curvature ($\rho_{x,j,k}$, $\rho_{y,j,k}$) of the wavefront are calculated from the first spot position ($x_{j,k}$, $y_{j,k}$). In contrast, in the present embodiment, the dummy tilt angle ($\theta_{x,j,k}$, $\theta_{y,j,k}$) and the dummy curvature ($\rho_{x,j,k}$, $\rho_{y,j,k}$) of the wavefront are calculated for each spot from the data of design values of the wavefront 104 (designed wavefront) of the object light (Steps 403 and 404). The design values of the wavefront 104 of the object light reflects the design data of the object. Therefore, Steps 403 and 404 include the case in which the calculation is performed on the basis of the design data of the object.

After that, data of the electric field $w_{0,j,k}(x, y)$ immediately after passing through the microlens array 103 is calculated for each spot from the image pickup conditions and the data of the design values (Step 405).

The wavefront 104 of the object light is caused to be incident on the microlens array 103 under the above-described image pickup conditions, and the first spot image is captured (Step 401). Then, the first spot position ($x_{j,k}$, $y_{j,k}$) of each spot is detected (Step 402). Also, the second spot image is simulated (Step 406). As illustrated in FIG. 6, the spot detection error varies in accordance with the positional relationship between the position of the light ray and the center of the CCD pixels. Therefore, in the case where the difference between the object light and the designed wavefront is such that the detected first spot position varies by p/10 or more, the following process may be carried out. That is, the positional relationship between the light ray and the CCD pixels assumed in the simulation may be determined on the basis of the spot position ($x_{j,k}$, $y_{j,k}$) determined in Step 402. Accordingly, in the simulation performed in Step 406, it is assumed that the optical axis of the microlens 106 is at the position ($x'_{0,j,k}$, $y'_{0,j,k}$) as expressed in Expressions (22) and (23).

$$x'_{0,j,k} = x_{j,k} - l_{j,k} \tan \theta_{y,j,k} \quad (22)$$

$$y'_{0,j,k} = y_{j,k} - l_{j,k} \tan \theta_{x,j,k} \quad (23)$$

Figure 8:
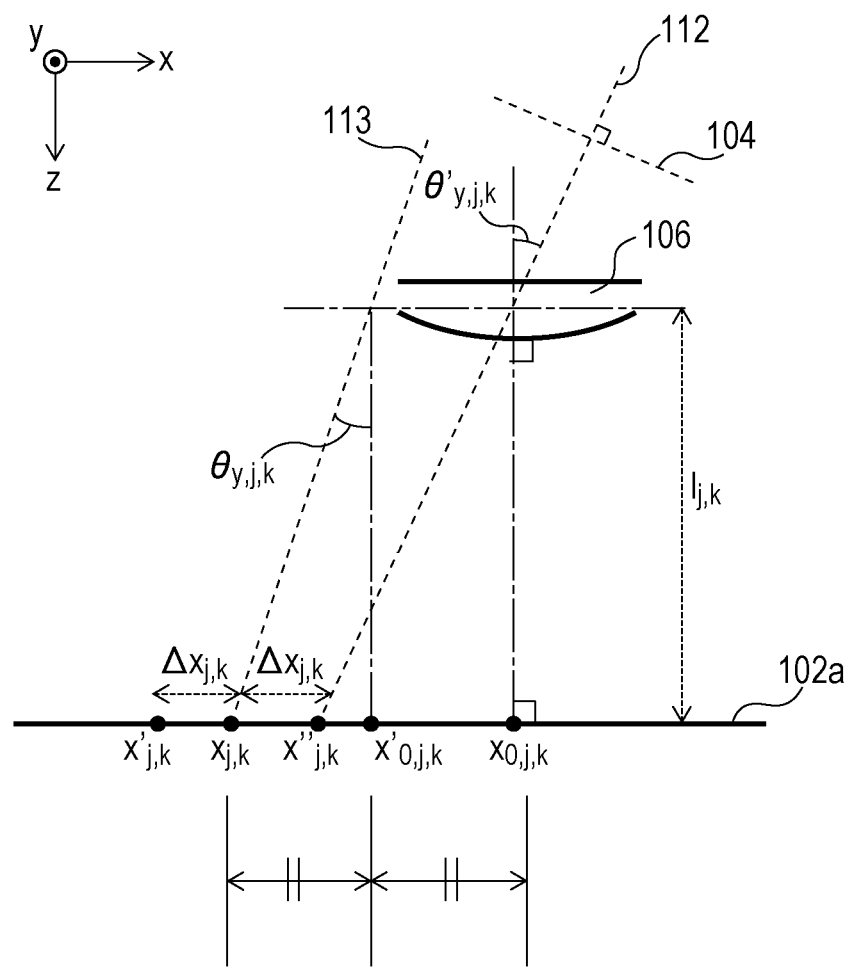
FIG. 8 is a diagram illustrating the relationship between a wavefront, a light ray, a microlens, a CCD receiving surface, and a detected spot position in the second embodiment.

In the simulation, it is assumed that the light ray is a light ray 113 illustrated in FIG. 8. Then, coordinate transformation from (x, y) to (x-$x_0$+$x_0$, y-$y_0$+$y_0$) is performed for the data of the electric field $w_{0,j,k}(x, y)$ immediately after passing through the microlens array 103, and the result of the coordinate transformation is substituted into Expressions (10) and (11) to calculate the spot image I'$_{m,n}$. After the spot image I'$_{m,n}$ has been simulated, the second spot position ($x'_{j,k}$, $y'_{j,k}$) of each spot is determined (Step 407). When the above-described steps are performed, the simulated positional relationship between the CCD pixels and the light ray reproduces the experimental result with an accuracy of 1/10 pix or more, and the accuracy of the simulation can be increased.

FIG. 8 illustrates the relationship between the second spot position ($x'_{j,k}$, $y'_{j,k}$) calculated as described above, the first spot position ($x_{j,k}$, $y_{j,k}$) determined from the actually formed spot image, and the correct spot position ($x''_{j,k}$, $y''_{j,k}$). The correct spot position ($x''_{j,k}$, $y''_{j,k}$) of each spot can be calculated from the first spot position ($x_{j,k}$, $y_{j,k}$) and the second spot position ($x'_{j,k}$, $y'_{j,k}$) by using Expressions (16) and (17), as in the first embodiment (Step 408). After the correct spot position ($x''_{j,k}$, $y''_{j,k}$) is calculated, the data of the wavefront 104 of the object light is calculated by a process similar to that in the first embodiment (Step 409).

With this method, similar to the first embodiment, the wavefront data in which the error due to the diffracted light from the adjacent microlenses is reduced can be calculated.

In addition, the electric field immediately after passing through the microlens 106 can be calculated in advance from the data of the design value of the wavefront 104 of the object light. Therefore, compared to the first embodiment, the time period from when the object light is received by the Shack-Hartmann sensor 101 to when the measurement result thereof is obtained can be reduced.

With the calibration methods for Shack-Hartmann sensors described in Applied Optics, Vol. 44, No. 30, p 6419 and Japanese Patent No. 3414368, spot position data generated when a known wavefront is incident is used. The technology for correcting the spot detection error according to the present embodiment can also be applied to these calibration methods.

Experiment Results

An experiment of correcting an error of a Shack-Hartmann sensor according to the present embodiment was performed. The Shack-Hartmann sensor included a microlens array in which circular microlenses having a focal length of 5 mm were arranged at a pitch of 150 μm, and a CCD camera having a pixel size of 9 μm. A plane wave having a wavelength of 638 nm was incident on the Shack-Hartmann sensor. The spot detection error was 108 nm before the correction, but was reduced to 45 nm by the correction according to the present embodiment.

Second Comparative Example

In the simulation according to the present embodiment, the electric field on the CCD light receiving surface 102a is calculated in accordance with Expression (11). However, the effect of the correction obtained when the simulation is performed in accordance with Expression (19) was also investigated. As a result, the spot detection error was 108 nm before the correction, and was also 108 nm after the correction. Thus, the correction was not effective. This suggests that when a function in which the travelling direction of the diffracted light is not correctly expressed, as in Expression (19), is used to calculate the electric field on the CCD light receiving surface 102a, no large correction effect can be achieved.

Third Embodiment

In a third embodiment, similar to the first embodiment, the Shack-Hartmann sensor illustrated in FIG. 1 is used.

Figure 9:
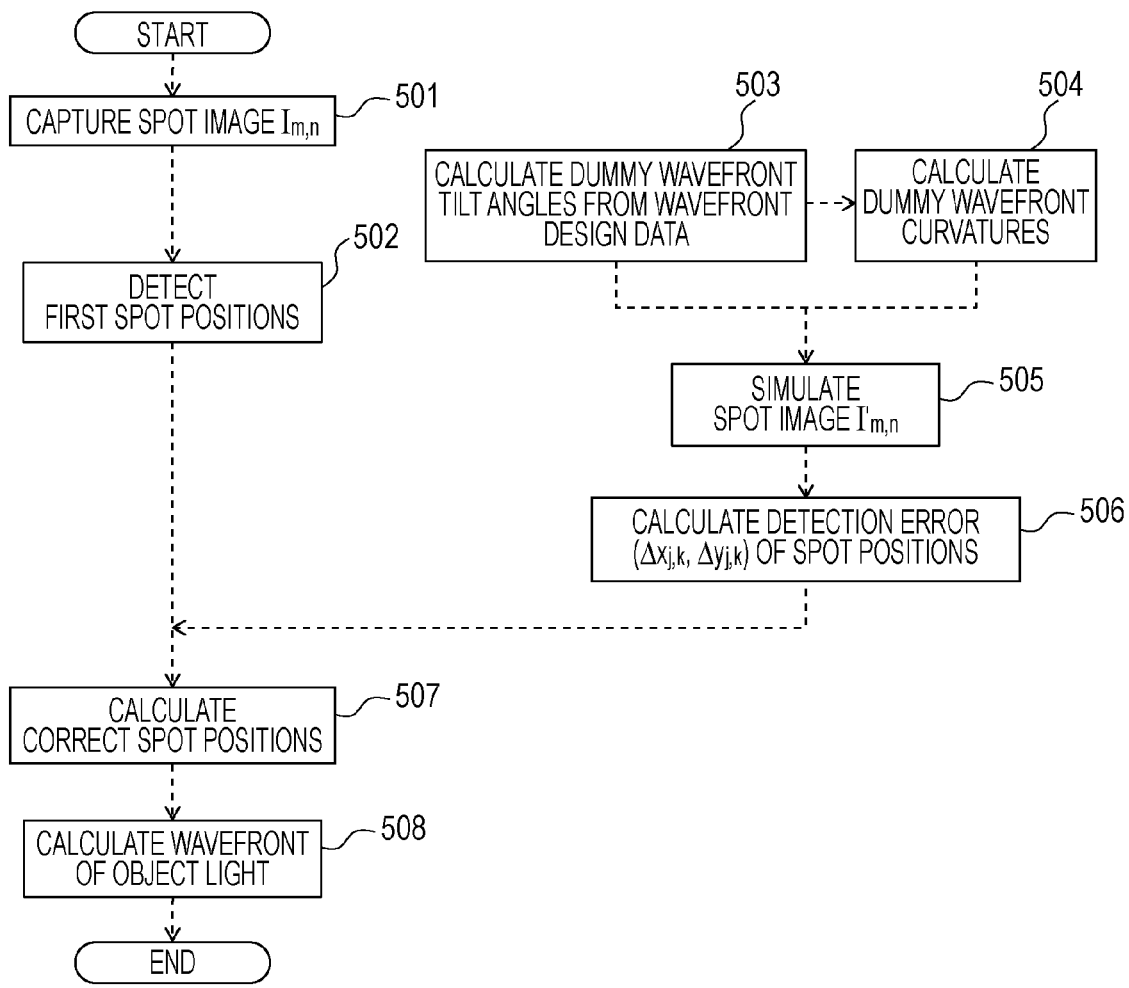
FIG. 9 is a flowchart of the procedure of a wavefront measurement method according to a third embodiment.

FIG. 9 illustrates the procedure of a wavefront measurement method according to the present embodiment. The procedure of the present embodiment is similar to that of the second embodiment except that the step of simulating the spot image I' (Step 505) differs from that in the second embodiment. It is assumed that the optical axis of each microlens 106 is at the position of the calibration data ($x_{0,j,k}$, $y_{0,j,k}$). More specifically, it is assumed that the intersection ($x'''_{j,k}$, $y'''_{j,k}$) of the light ray that passes through the center of each microlens 106 and the CCD light receiving surface 102a is at a position calculated from Expressions (24) and (25) by using an approximate tilt angle ($\theta_{x,j,k}$, $\theta_{y,j,k}$) (dummy tilt angle of the wavefront) calculated from the designed wavefront.

$$x'''_{j,k} = x_{0,j,k} + l_{j,k} \tan \theta_{y,j,k} \quad (24)$$

$$y'''_{j,k} = y_{0,j,k} + l_{j,k} \tan \theta_{x,j,k} \quad (25)$$

Figure 10:
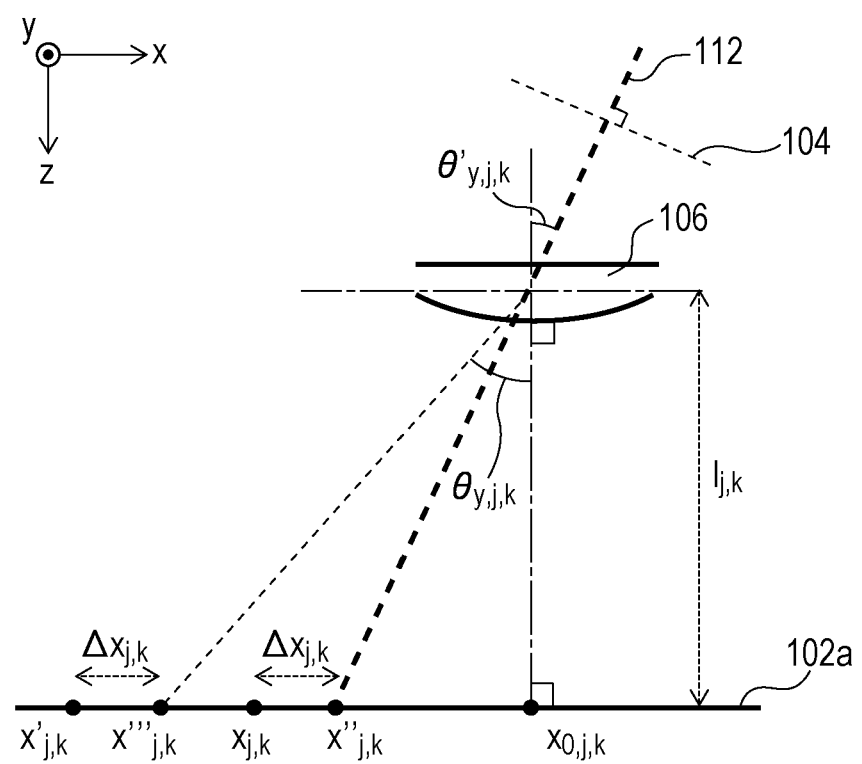
FIG. 10 is a diagram illustrating the relationship between a wavefront, a light ray, a microlens, a CCD receiving surface, and a detected spot position in the third embodiment.

FIG. 10 illustrates the arrangement based on these assumptions.

The second spot position ($x'_{j,k}$, $y'_{j,k}$) is determined from the spot image I' determined by simulation. After that, the spot detection error ($\Delta x_{j,k}$, $\Delta y_{j,k}$) is determined for each spot from ($x'_{j,k}$, $y'_{j,k}$) and ($x'''_{j,k}$, $y'''_{j,k}$) by using Expressions (26) and (27) (Step 506).

$$\Delta x_{j,k} = x'_{j,k} - x'''_{j,k} \quad (26)$$

$$\Delta y_{j,k} = y'_{j,k} - y'''_{j,k} \quad (27)$$

Then, the correct spot position ($x''_{j,k}$, $y''_{j,k}$) is calculated for each spot by Expressions (28) and (29) (Step 507).

$$x''_{j,k} = x_{j,k} - \Delta x_{j,k} \quad (28)$$

$$y''_{j,k} = y_{j,k} - \Delta y_{j,k} \quad (29)$$

Other steps (501, 502, 503, 504, 508) are the same as those in the second embodiment (401, 402, 403, 404, 409).

When the wavefront 104 of the object light is shifted from the designed wavefront only by such an amount that the displacement of the spot position is p/10 or less, the relationship between the spot image and the pixel arrangement of the image pickup element 101 can be accurately simulated and the detection error can be corrected by the above-described method. With this method, the spot detection error ($\Delta x_{j,k}$, $\Delta y_{j,k}$) can be calculated before the object light is received by the Shack-Hartmann sensor 101.

Therefore, compared to the first and second embodiments, the time period from when the object light is received by the Shack-Hartmann sensor 101 to when the measurement result thereof is obtained can be reduced.

Fourth Embodiment

Figure 11:
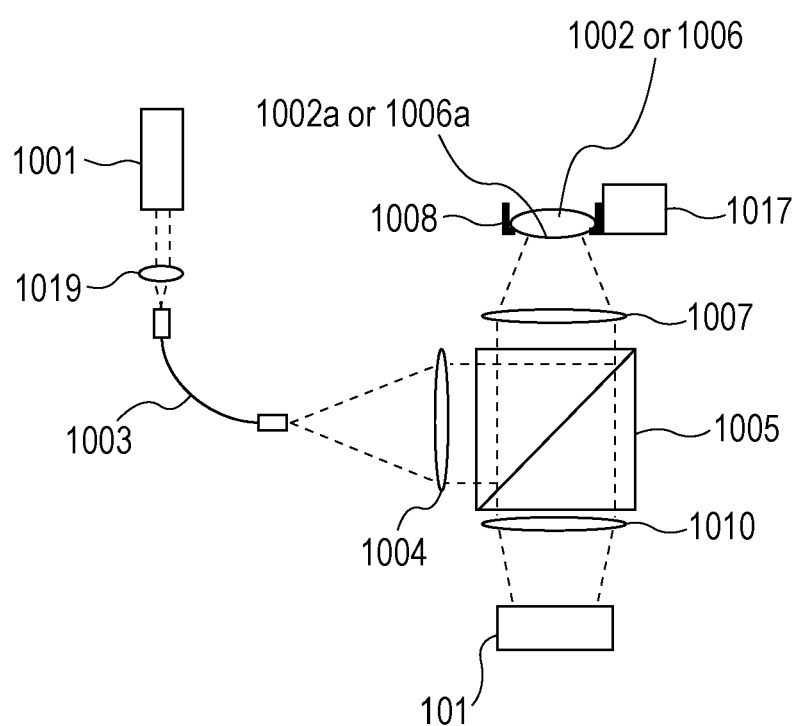
FIG. 11 is a diagram illustrating a shape measurement apparatus according to a fourth embodiment.

FIG. 11 illustrates a shape measurement apparatus according to a fourth embodiment in which a wavefront measurement method according to an embodiment of the present invention is used.

This apparatus includes a light source 1001, an optical fiber 1003 which guides light emitted from the light source 1001, and a condensing lens 1019 which causes the light emitted from the light source 1001 to be incident on the optical fiber 1003. The apparatus further includes a collimator lens 1004 that converts the light emitted from the optical fiber 1003 into a planar wave, a beam splitter 1005 that reflects the planar wave, and an objective lens 1007 which converts the planar wave reflected by the beam splitter 1005 into a spherical wave and irradiates an aspherical object surface 1006a of an object optical element 1006 or a reference surface 1002a of a standard 1002 with the aspherical wave. The apparatus further includes an optical element holder 1008 which holds the object optical element 1006, which is an object, or the standard 1002, and a fine stage 1017 for adjusting the position and orientation of the optical element holder 1008. The apparatus further includes the Shack-Hartmann sensor 101 illustrated in FIG. 1 for monitoring the wavefront reflected by the aspherical object surface 1006a or the reference surface 1002a. The Shack-Hartmann sensor 101 is calibrated in advance by a method similar to the method described in the first embodiment. In other words, the Shack-Hartmann sensor 101 is installed in the apparatus after the optical axis position ($x_{0,j,k}$, $y_{0,j,k}$) of each microlens 106 and distance from each microlens 106 to the CCD light receiving surface 102a are determined (j=1, 2, ..., k=1, 2, ...). The apparatus further includes an image forming lens 1010 for forming an image of the wavefront reflected by the aspherical object surface 1006a or the reference surface 1002a on the Shack-Hartmann sensor 101.

Figure 12:
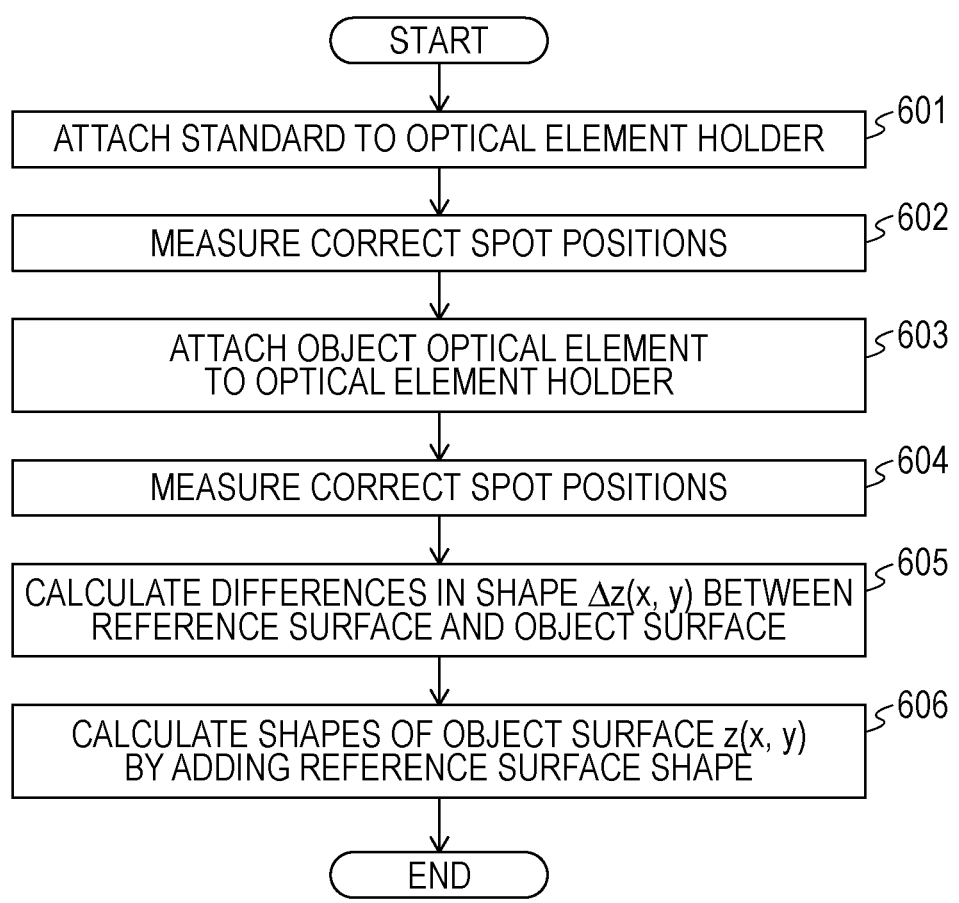
FIG. 12 is a flowchart of the procedure of a shape measurement method according to the fourth embodiment.

FIG. 12 illustrates the procedure of a shape measurement method according to the present embodiment. First, the standard 1002 is attached to the optical element holder 1008 (Step 601). The shape $z_0$(x, y) of the reference surface 1002a of the standard 1002 is known. The position of the standard 1002 is adjusted by the fine stage 1017 so that the optical axis of the objective lens is as close to the center of the reference surface 1002a as possible. At this time, the spherical wave emitted from the objective lens 1007 is reflected by the reference surface 1002a, passes through the objective lens 1007, the beam splitter 1005, and the image forming lens 1010, and is incident on the Shack-Hartmann sensor 101. After the standard 1002 is attached to the optical element holder 1008, the correct spot position ($x_{B,j,k}$, $y_{B,j,k}$), in which the influence of the diffracted light is reduced, is determined for the light ray that passes through the center of each microlens 106 of the Shack-Hartmann sensor 101. For example, the correct spot position ($x_{B,j,k}$, $y_{B,j,k}$) of each spot is determined by the method described in the first embodiment in accordance with the procedure of Steps 201 to 207 (Step 602).

After the correct spot position ($x_{B,j,k}$, $y_{B,j,k}$) of each spot is determined assuming that the light reflected by the standard 1002 is the object light, the object optical element 1006 is attached to the optical element holder 1008 (Step 603). The position of the object optical element 1006 is adjusted by the fine stage 1017 so that the optical axes of the objective lens 1007 and the aspherical object surface 1006a coincide with each other. At this time, the wavefront of the light reflected by the aspherical object surface 1006a reflects the shape of the aspherical object surface 1006a, and this light passes through the objective lens 1007 and the image forming lens 1010 and is incident on the Shack-Hartmann sensor 101 as the object light. The correct spot position ($x_{S,j,k}$, $y_{S,j,k}$) of each spot generated by the light reflected by the object optical element 1006 is determined by a wavefront measurement method of the same procedure as that used to measure the standard, that is, in accordance with Steps 201 to 207 of the first embodiment (Step 604).

After the correct spot position ($x_{S,j,k}$, $y_{S,j,k}$) of the spot generated by the light reflected by the object optical element 1006 is calculated, the difference in tilt angle ($\Delta\theta_{x,j,k}$, $\Delta\theta_{y,j,k}$) between the wavefront measured by using the standard and that measured by using the object optical element is determined by Expressions (30) and (31).

$$\Delta\theta_{x,j,k} = \mathrm{Tan}^{-1}\left(\frac{y_{S,j,k} - y_{0,j,k}}{l_{j,k}}\right) - \mathrm{Tan}^{-1}\left(\frac{y_{B,j,k} - y_{0,j,k}}{l_{j,k}}\right) \quad (30)$$

$$\Delta\theta_{y,j,k} = \mathrm{Tan}^{-1}\left(\frac{x_{S,j,k} - x_{0,j,k}}{l_{j,k}}\right) - \mathrm{Tan}^{-1}\left(\frac{x_{B,j,k} - x_{0,j,k}}{l_{j,k}}\right) \quad (31)$$

When the magnification of the objective lens 1007 and the image forming lens 1010 is t, the difference in tilt angle ($\Delta\theta'_x$(x, y), $\Delta\theta'_y$(x, y)) between the reference surface 1002a and the aspherical object surface 1006a at the position (x, y) can be determined by Expressions (32) and (33).

$$\Delta\theta'_x(tx_{0,j,k}, ty_{0,j,k}) = \frac{\Delta\theta_{x,j,k}}{2t} \quad (32)$$

$$\Delta\theta'_y(tx_{0,j,k}, ty_{0,j,k}) = \frac{\Delta\theta_{y,j,k}}{2t} \quad (33)$$

Instead of using Expressions (32) and (33), light ray tracing can be performed from ($\Delta\theta_{x,j,k}$($x_{0,j,k}$, $y_{0,j,k}$), $\Delta\theta_{y,j,k}$ ($x_{0,j,k}$, $y_{0,j,k}$)) on the basis of the shapes of the objective lens 1007 and the image forming lens 1010 and the arrangement thereof. By performing light ray tracing, the difference in tilt angle ($\Delta\theta'_x$, $\Delta\theta'_y$) can be determined with a higher accuracy. The thus-determined difference in tilt angle is two-dimensionally integrated over the xy plane, so that a shape difference $\Delta z(x, y)$ between the aspherical object surface 1006a and the reference surface 1002a can be determined for each spot (Step 605).

In addition, the following calculation n is performed.

$$z(x,y)=z_0(x,y)\times\Delta z(x,y) \quad (34)$$

Thus, the shape of the aspherical object surface 1006a can be determined (Step 606).

According to the present embodiment, the shape data in which the error due to the diffracted light from the adjacent microlenses is reduced can be calculated.

In the present embodiment, the difference in wavefront tilt angle ($\Delta\theta_{x,j,k}$, $\Delta\theta_{y,j,k}$) is calculated in accordance with the first embodiment, and the shape of the aspherical object surface 1006a is determined from the result of the calculation. The difference in wavefront tilt angle is the tilt angle of the wavefront reflected by the object surface with respect to the wavefront reflected by the reference surface, and the wavefront tilt angle is wavefront data in a broad sense. In other words, the difference in wavefront tilt angle corresponds to the wavefront data of the light reflected by the aspherical object surface. Therefore, the present embodiment corresponds to the case in which the wavefront of the light reflected by the object is calculated by the wavefront measurement method according to the first embodiment, and the shape of the object is calculated from the result of the calculation. Although the wavefront measurement method according to the first embodiment is used in the shape measurement method according to the present embodiment, wavefront measurement methods according to the second and third embodiments may instead be used. In such a case, the wavefront incident on the Shack-Hartmann sensor 101 is calculated from the designed shapes of the aspherical object surface 1006a and the reference surface 1002a, and the calculated wavefront is handled as the "designed wavefront" according to the second and third embodiments.

Optical Element Manufacturing Method

In the case where the shape measurement method according to the present embodiment is applied to, for example, manufacturing of an optical element, a process for reducing the value of the shape difference may be performed by using the data of the shape difference $\Delta z(x, y)$ obtained in Step S605.

With the wavefront measurement method according to an embodiment of the present invention, an error due to interference between a spot and diffracted light is corrected. As a result, the error due to the interference between the spot and the diffracted light is reduced, and high-accuracy wavefront measurement can be achieved.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2013-159174, filed Jul. 31, 2013, which is hereby incorporated by reference herein in its entirety.

What is claimed is:

1. A wavefront measurement method comprising steps of:
   causing object light to be incident on a Shack-Hartmann sensor, which includes an image sensor and a microlens array including a plurality of microlenses, and capturing a first spot image under image pickup conditions;
   calculating, based on the first spot image, data of first spot positions that correspond to the first spot image;
   simulating a second spot image based on the image pickup conditions and information of a travelling direction of diffracted light generated when the object light passes through the microlenses;
   calculating second spot positions that correspond to the second spot image; and
   correcting the data of the first spot positions based on data of the second spot positions including data of a detection error due to the diffracted light, and calculating data of a wavefront of the object light.

2. The wavefront measurement method according to claim 1, wherein the image sensor is a charge coupled device (CCD) image sensor or a complimentary metal-oxide semiconductor (CMOS) image sensor.

3. The wavefront measurement method according to claim 1, wherein the simulating step is performed based on a curvature of the wavefront of the object light.

4. The wavefront measurement method according to claim 1, wherein the information of the travelling direction of the diffracted light is calculated based on the image pickup conditions and the data of the first spot positions.

5. The wavefront measurement method according to claim 1,
   wherein the simulating step includes sub-steps of:
      calculating data of a first electric field, which is an electric field of the object light immediately after the object light has passed through the microlenses,
      calculating data of a second electric field, which is an electric field on a light receiving surface of the image sensor, from the data of the first electric field, and
      calculating the second spot image from the data of the second electric field, and
   wherein the data of the second electric field includes the information of the travelling direction of the diffracted light.

6. The wavefront measurement method according to claim 5, wherein the data of the second electric field is calculated by an angular spectrum method or a finite difference time domain method.

7. The wavefront measurement method according to claim 4, wherein the data of the first spot positions is corrected on an assumption that the first spot positions are intersections of light rays of the object light that pass through centers of corresponding microlenses and a light receiving surface of the image sensor, and on an assumption that differences between the first spot positions and correct spot positions are equal to differences between the second spot positions and the first spot positions.

8. The wavefront measurement method according to claim 7, wherein, in the simulating step, an output of the image sensor is simulated based on relative displacements between positions of the intersections and a center of pixels of the image sensor.

9. The wavefront measurement method according to claim 1, wherein the information of the travelling direction of the diffracted light is calculated based on the image pickup conditions and data of a design value of the wavefront of the object light.

10. The wavefront measurement method according to claim 9, wherein the second spot image is simulated based on the data of the first spot positions and data of an electric field of light that has passed through the microlens array, the data of the electric field being calculated based on the data of the design value of the wavefront of the object light.

11. The wavefront measurement method according to claim 9, wherein the data of the first spot positions is corrected by using the detection error due to the diffracted light, the detection error being calculated based on the data of the second spot positions, and the data of the wavefront of the object light is calculated.

12. A shape measurement method comprising a step of:
calculating a shape of an object based on a wavefront of reflected light generated when the object is irradiated with light, the wavefront being calculated by the wavefront measurement method according to claim 1, wherein the object light is the reflected light.

13. An optical element manufacturing method comprising steps of:
processing an optical element; and
measuring a shape of the processed optical element by the shape measurement method according to claim 12.

14. An optical apparatus manufacturing method comprising steps of:
manufacturing an optical apparatus; and
measuring a wavefront of light emitted from the optical apparatus by the wavefront measurement method according to claim 1.

15. The wavefront measurement method according to claim 1, wherein the second spot image is simulated by combining an electric field of light condensed by the microlenses and an electric field of diffracted light which is generated when the object light passes through the microlenses and which propagates in a direction different from a travelling direction of the electric field of the condensed light.

16. The wavefront measurement method according to claim 15, wherein the information of the travelling direction of the diffracted light is calculated based on the image pickup conditions and the data of the first spot positions.

17. The wavefront measurement method according to claim 15,
wherein the simulating step includes sub-steps of:
calculating data of a first electric field, which is an electric field of the object light immediately after the object light has passed through the microlenses,
calculating data of a second electric field, which is an electric field on a light receiving surface of the image sensor, from the data of the first electric field, and
calculating the second spot image from the data of the second electric field, and
wherein the data of the second electric field includes the information of the travelling direction of the diffracted light.

18. The wavefront measurement method according to claim 17, wherein the data of the second electric field is calculated by an angular spectrum method or a finite difference time domain method.

19. The wavefront measurement method according to claim 16, wherein the data of the first spot positions is corrected on an assumption that the first spot positions are intersections of light rays of the object light that pass through centers of corresponding microlenses and a light receiving surface of the image sensor, and on an assumption that differences between the first spot positions and correct spot positions are equal to differences between the second spot positions and the first spot positions.

20. The wavefront measurement method according to claim 19, wherein, in the simulating step, an output of the image sensor is simulated based on relative displacements between positions of the intersections and a center of pixels of the image sensor.

21. The wavefront measurement method according to claim 15, wherein the information of the travelling direction of the diffracted light is calculated based on the image pickup conditions and data of a design value of the wavefront of the object light.

22. The wavefront measurement method according to claim 21, wherein the second spot image is simulated based on the data of the first spot positions and data of an electric field of light that has passed through the microlens array, the data of the electric field being calculated based on the data of the design value of the wavefront of the object light.

23. The wavefront measurement method according to claim 15, wherein the simulating step is performed based on a curvature of the wavefront of the object light.

24. The wavefront measurement method according to claim 21, wherein the data of the first spot positions is corrected by using the detection error due to the diffracted light, the detection error being calculated based on the data of the second spot positions, and the data of the wavefront of the object light is calculated.

25. A shape measurement method comprising a step of:
calculating a shape of an object based on a wavefront of reflected light generated when the object is irradiated with light, the wavefront being calculated by the wavefront measurement method according to claim 16, wherein the object light is the reflected light.

26. An optical element manufacturing method comprising steps of:
processing an optical element; and
measuring a shape of the processed optical element by the shape measurement method according to claim 25.

27. An optical apparatus manufacturing method comprising the steps of:
manufacturing an optical apparatus; and
measuring a wavefront of light emitted from the optical apparatus by the wavefront measurement method according to claim 15.

28. A Shack-Hartmann sensor comprising:
an image sensor;
a microlens array including a plurality of microlenses; and
a calculator configured to perform calculations based on data output from the image sensor,
wherein the calculator is configured to
calculate data of first spot positions based on a first spot image of object light, the first spot positions corresponding to the first spot image, and the first spot image being captured by the Shack-Hartmann sensor under image pickup conditions,
simulate a second spot image based on the image pickup conditions and information of a travelling direction of diffracted light generated when the object light passes through the microlenses,
calculate second spot positions that correspond to the second spot image, and
calculate data of a wavefront of the object light by correcting the data of the first spot positions based on data of the second spot positions including data of a detection error due to the diffracted light.

29. The Shack-Hartmann sensor according to claim 28, wherein the image sensor is a charge coupled device (CCD) image sensor or a complimentary metal-oxide semiconductor (CMOS) image sensor.

* * * * *